April 3, 1962 C. W. NEEFE 3,027,598
METHOD OF CASTING A SPECTACLE BRIDGE AND NOSE
GUARD AND APPARATUS THEREFOR
Filed April 18, 1958 2 Sheets-Sheet 1
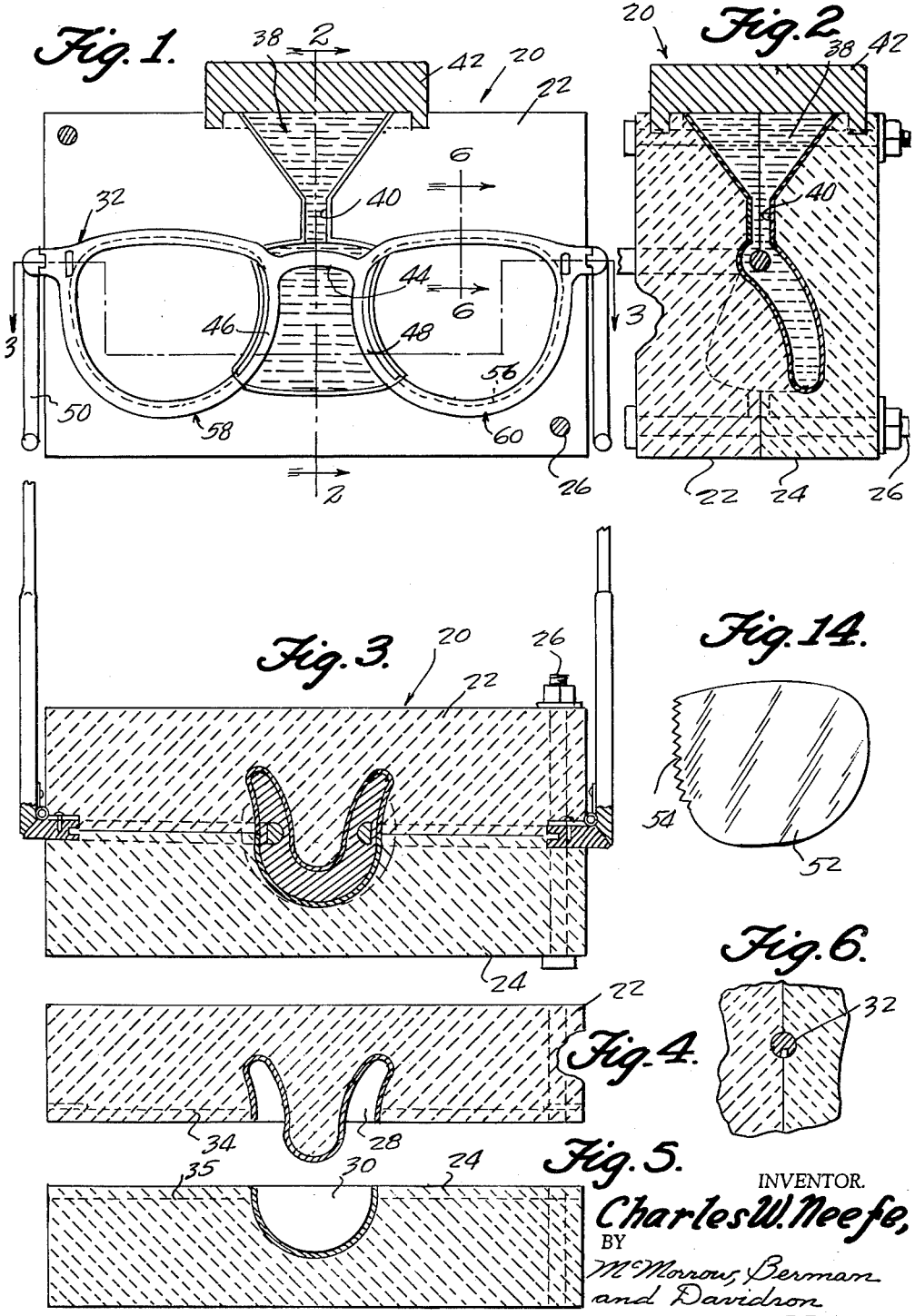
INVENTOR.
Charles W. Neefe,
BY
McMorrow, Berman
and Davidson
ATTORNEYS

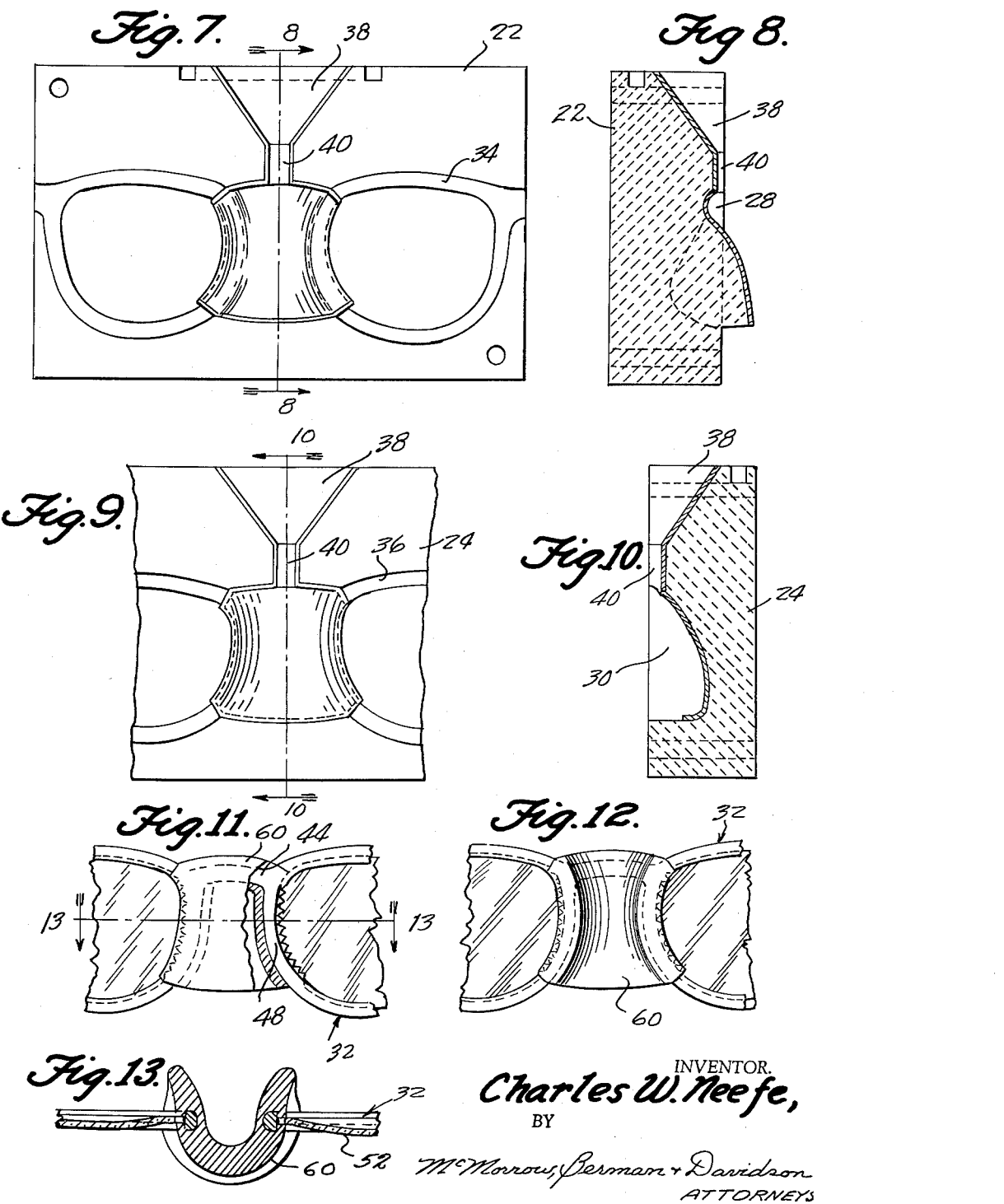

United States Patent Office 3,027,598
Patented Apr. 3, 1962

3,027,598
METHOD OF CASTING A SPECTACLE BRIDGE AND NOSE GUARD AND APPARATUS THEREFOR
Charles W. Neefe, Big Spring, Tex., assignor to Neefe-Hamilton Research Company, Inc., Big Spring, Tex.
Filed Apr. 18, 1958, Ser. No. 729,364
4 Claims. (Cl. 18—36)

The present invention relates to spectacles generally and in particular to a method of and apparatus for casting a unitary spectacle bridge and nose guard.

An object of the present invention is to provide a method for casting a unitary spectacle bridge and nose guard which is efficient and commercially practical.

Another object of the present invention is to provide a method of casting a unitary spectacle bridge and nose guard which enables an operator to secure a nose guard to the plastic bridge and plastic lens frame of a pair of spectacles without deformation of the plastic bridge or frame.

A further object of the present invention is to provide an apparatus for use in casting a unitary spectacle bridge and nose guard which is simple in structure, one easily and economically constructed, and one which is highly effective in action.

These and other objects and advantages of the present invention will be fully apparent from the following description when taken in conjunction with the annexed drawings, in which:

FIGURE 1 is a sectional view of the mold used in the apparatus of the present invention, a spectacle frame being supported on the mold and the mold cavity shown as filled with a casting fluid;

FIGURE 2 is a view as seen on line 2—2 of FIGURE 1;

FIGURE 3 is a view as seen on line 3—3 of FIGURE 1;

FIGURE 4 is a sectional view of one-half of the mold;

FIGURE 5 is a sectional view of the other half of the mold;

FIGURE 6 is a fragmentary view taken on the line 6—6 of FIGURE 1;

FIGURE 7 is a view of one-half of the mold showing the first step in carrying out the method of the present invention;

FIGURE 8 is a view taken on the line 8—8 of FIGURE 7;

FIGURE 9 is a fragmentary view of the other half of the mold, showing another step in carrying out the method of the present invention;

FIGURE 10 is a view taken on the line 10—10 of FIGURE 9;

FIGURE 11 is a fragmentary sectional view of the spectacle frame and lenses with the unitary bridge and nose guard of the present invention installed thereon, a portion being shown in section;

FIGURE 12 is an elevational view of the assembly shown in FIGURE 11 from the other side;

FIGURE 13 is a view taken on line 13—13 of FIGURE 11; and

FIGURE 14 is a plan view of one of the lens removed from the spectacle as formed by the method of the present invention.

In carrying out the method of the present invention, a mold, designated generally by the reference numeral 20, is provided, the mold 20 having a pair of complemental half sections 22 and 24 with detachable means, embodying a pair of bolts 26, for securing the half sections 22 and 24 together.

The sections 22 and 24 are provided with complemental cavities 28 and 30, respectively, which, when the sections 22 and 24 are together, form a single cavity conformably shaped to the unitary bridge and nose guard unit to be cast, such unit being shown in FIGURES 11 to 13.

The mold sections 22 and 24 are provided with complementally arranged openings receiving and holding the remaining portions of the lens frame of the spectacle frame 32, such openings being represented by dotted lines in FIGURES 4 and 5 and designated by the reference numerals 34 and 35, respectively.

The mold sections 22 and 24 are formed with complementally arranged parts of a funnel-shaped supply passage, as at 38 in FIGURE 1. The passage 38 has its larger end opening through the top of the mold sections when they are put together and has a restricted passage 40 connecting the smaller end of the passage 38 with the interior of the cavity formed by the cavities 28 and 30 in the sections when the sections are bolted together. A cover 42 is positioned over and removable from the larger end of the passage 38 when the sections 22 and 24 are together.

In carrying out the method of the present invention, the following steps are taken. First, the spectacle frame 32 is positioned in the complemental openings 34 and 35 with the bridge portion 44 and adjacent portions of the lens frames 46 and 48 (FIGURE 1) overlying the cavity formed by the cavities 28 and 30 in the sections 22 and 24. The temples 50 of the spectacles remain outside of the mold 20. Previously, the walls of the passages 38 and 40 have been given a coat of shellac or varnish to make the walls impervious to the passage of water. The mold sections 22 and 24 are formed of an absorbent material such as plaster of Paris or unglazed ceramic ware which readily absorb water. The cavities 28 and 30 also have been previously prepared by coating the walls thereof with a liquid latex water suspension before the sections 22 and 24 are put together and secured by the bolts 26. With the spectacle 32 in place in the space between the mold sections, the cavities 28 and 30 are filled with the liquid latex water suspension until the connector or bridge 44 and the portions 46 and 48 of the lens frames are totally submerged in the liquid. The reservoir formed by the passage 38 is then filled with the same liquid and the cover 42 is placed over the upper end of such reservoir and the mold 20 is allowed to remain quiescent until the water in the suspension has been substantially absorbed by the cavity walls and the latex in the suspension has set to a firm latex mass conformably shaped to the cavity formed by the cavities 28 and 30, as shown in FIGURES 11 to 13. Next, further amounts of the liquid latex water suspension are introduced from the passage 38 into the cavity formed by the mold cavities 28 and 30, each liquid suspension introduction being followed by a period of permitting the mold cavity formed by the cavities 28 and 30 to remain quiescent, until the cavity has been completely filled with a firm latex mass conformably shaped to the cavity formed by the mold cavities 28 and 30. When the water has totally left the latex mass, the sections 22 and 24 are separated and the spectacles with the unitary bridge and nose guard unit formed by the mass, as at 60 in FIGURES 11 to 13, are removed from the mold halves and any portion of the latex left in the passage 40 or the passage 38 is cut away from the unit.

Next, the lens 52 is inserted in each of the lens frames and each lens 52 is provided with spaced teeth 54 along one side thereof which embed themselves in the latex unit as shown most clearly in FIGURES 11 and 12. The remaining portions of the lens frames are provided with a groove as at 56 in FIGURE 1, represented as a dotted line, the lens frames of the spectacle 32 being designated by the reference numerals 58 and 60.

The spectacle provided with the unitary bridge and nose guard, formed by the method of the present invention and using the apparatus of the present invention, is most useful for wear by athletes and others who are engaged in activities which may possibly result in blows to the face of the wearer of the spectacles. The spectacles provided with the unitary bridge and nose guard unit of the present invention serves to cushion blows to the bridge of the nose of the wearer and protects the bridge section of the spectacles from twisting forces which frequently cause the loss of one or both lens from their frames.

What is claimed is:

1. The method for casting a unitary bridge and nose guard unit about the connector and adjacent portions of the bridge frame of a spectacle frame which comprises providing a mold cavity conformably shaped to said unit with the walls of said cavity being formed of water-absorptive material, placing said connector and the adjacent portions of the lens frames within said cavity, introducing a liquid latex water suspension into said cavity until said connector and adjacent portions of the lens frames are completely submerged, permitting the mold cavity to remain quiescent until the water of the suspension has been substantially absorbed by the cavity walls and the latex has set to a firm latex mass conformably shaped to said cavity, and recovering said spectacle frame carrying the unitary bridge and nose guard unit from said mold cavity.

2. The method for casting a unitary bridge and nose guard unit about the connector and adjacent portions of the bridge frame of a spectacle frame which comprises providing a mold cavity conformably shaped to said unit with the walls of said cavity being formed of water-absorptive material, placing said connector and the adjacent portions of the lens frames within said cavity, introducing a liquid latex water suspension into said cavity until said connector and adjacent portions of the lens frames are completely submerged, permitting the mold cavity to remain quiescent until the water of the suspension has been substantially absorbed by the cavity walls and the latex has set to a firm latex mass conformably shaped to said cavity, introducing further amounts of said liquid latex water suspension into said cavity followed by periods of permitting the mold cavity to remain quiescent until the cavity has been completely filled with a firm latex mass conformably shaped to said cavity, and recovering said spectacle frame carrying the unitary bridge and nose guard unit from said mold cavity.

3. Apparatus for casting a unitary bridge and nose guard unit about the connector and adjacent portions of the lens frames of a spectacle frame comprising a mold provided with a mold cavity conformably shaped to said unit, said mold being provided with a conformably shaped opening for receiving and holding the remaining portions of the lens frames of said spectacle frame, there being a funnel-shaped supply passage in said mold and having the larger end opening through one side of said mold, and a restricted passage connecting the smaller end of said funnel-shaped passage with the interior of said cavity, and a removable cover closing the larger end of said funnel-shaped passage.

4. The apparatus according to claim 3 wherein said mold embodies a pair of complemental half sections, and detachable means for securing said pair of sections together.

References Cited in the file of this patent

UNITED STATES PATENTS

| | | |
|---|---|---|
| 2,161,281 | Carter | June 6, 1939 |
| 2,163,814 | Swarovski | June 27, 1939 |
| 2,582,022 | Feldman et al. | Jan. 8, 1952 |
| 2,682,196 | Baldanza et al. | June 29, 1954 |
| 2,716,623 | Tator | Aug. 30, 1955 |